United States Patent [19]

Huhn et al.

[11] 4,357,437

[45] Nov. 2, 1982

[54] PROCESS FOR THE PRODUCTION OF WATER-SOLUBLE HYDROLYZED PRODUCTS OF POLYACRYLONITRILE POLYMERS

[75] Inventors: Helmut Huhn, Walsrode; Werner Karstens, Bomlitz; Lutz Hoppe, Walsrode, all of Fed. Rep. of Germany

[73] Assignee: Wolff Walsrode AG, Leverkusen, Fed. Rep. of Germany

[21] Appl. No.: 286,262

[22] Filed: Jul. 23, 1981

[30] Foreign Application Priority Data

Jul. 31, 1980 [DE] Fed. Rep. of Germany ....... 3029027

[51] Int. Cl.$^3$ .............................................. C08F 8/12
[52] U.S. Cl. ................................... 524/458; 525/242; 525/369; 525/383; 526/202
[58] Field of Search ............... 524/458; 525/242, 383, 525/369; 526/202

[56] References Cited

U.S. PATENT DOCUMENTS

| | | | |
|---|---|---|---|
| 3,419,502 | 12/1968 | Newman | 252/180 |
| 3,515,692 | 6/1970 | Corrock et al. | 524/458 |
| 3,553,116 | 1/1971 | Kaplan et al. | 524/458 |
| 3,957,711 | 5/1976 | Powanda et al. | 524/458 |

FOREIGN PATENT DOCUMENTS 1104567 2/1968 United Kingdom .

*Primary Examiner*—William F. Hamrock
*Attorney, Agent, or Firm*—Connolly and Hutz

[57] ABSTRACT

A process for the production of water-soluble hydrolyzed polyacrylonitrile polymers, wherein the acrylonitrile is polymerized in the presence of 1–8% by weight of hydrolyzed polyacrylonitrile and hydrolyzed without intermediate isolation from the reaction mixture.

8 Claims, No Drawings

PROCESS FOR THE PRODUCTION OF WATER-SOLUBLE HYDROLYZED PRODUCTS OF POLYACRYLONITRILE POLYMERS

This invention relates to a process for the production of polyacrylonitrile polymers by polymerising acrylonitrile and, optionally, other monomers in the presence of hydrolysed polyacrylonitrile, followed by hydrolysis without intermediate isolation of the polymerisation product.

German Patent No. 1,207,086 describes a process for the production of hydrolysis products of polyacrylonitrile in which polyacrylonitrile powders or fibres are hydrolysed to form products which contain no additional nitrile groups. To obtain homogeneous polyacrylonitrile hydrolysates, fine particles of polyacrylonitrile have to be used. If coarse-grained or fibrous polyacrylonitriles are used, hydrolysis has to be preceded by size reduction.

According to German Offenlegungsschrift No. 2,031,972, hydrolysis products of polyacrylonitrile, must still contain some nitrile groups for certain applications, for example as a protective colloid for aqueous, deep-bore flushing compositions. In this process, too, the polymer has to be size-reduced before hydrolysis.

Where polyacrylonitrile polymers obtained by emulsion polymerisation are used, the hydrolysates contain residues and/or troublesome degradation products of the emulsifier which complicate and restrict production and processing of the polyacrylonitrile hydrolysates through intense foaming.

Accordingly, known processes for the production of hydrolysates of polyacrylonitrile have the disadvantage that the produced polyacrylonitrile has to be isolated and purified in separate process steps in order to obtain a hydrolysate which satisfies the desired requirements. This necessitates developing an inexpensive and environmentally acceptable process for the production of hydrolysis products of polyacrylonitrile which, in particular, satisfy quality requirements for use as a protective colloid, as a finishing agent for cellulose products and/or as a starting material for adhesives and sizes.

According to this invention an acrylonitrile polymer is obtained which-without any need for further purification or mechanical treatment—represents an optimal starting material for subsequent hydrolysis.

Accordingly, the present invention provides a process for the production of water-soluble hydrolysis products of acrylonitrile homopolymers and/or copolymers which comprise polymerising acrylonitrile and, optionally, other monomers in aqueous media wherein the polymerisation is carried out at a temperature in the range from 35° C. to 80° C. in the presence of 1 to 8% by weight and preferably 4% to 6% by weight, based on the monomers to be polymerised, of a hydrolysed acrylonitrile homopolymer and/or copolymer having an intrinsic viscosity $[\eta]$ of from 0.8 to 2.5 dl/g as an emulsifier and the resulting polymer is hydrolysed by known methods without being isolated and/or size reduced.

The acrylonitrile and, optionally, the other monomers preferably monovinyl monomers such as acrylic acid esters, methacrylic acid esters, maleic acid esters or substitution products of acrylonitrile, are preferably polymerised by known suspension polymerisation processes. In this case, the proportion of organic substances to water should amount to 20%–50% by weight and preferably to 30%–40% by weight. By the addition of hydrolysed acrylonitrile homopolymers and/or copolymers, preferably those which are formed in the process according to the invention as emulsifiers, all troublesome side products are avoided without any need for the polymer to be isolated therefrom. From 1 to 8% by weight of isopropanol, based on the monomers, may also be added during the polymerisation reaction.

This addition is particularly recommended in the production of the emulsifier. The protective colloid should preferably have the following composition: hydrolysed polyacrylonitrile homopolymer and/or copolymer consisting of:

45 to 60% by weight of ammonium acrylate units;

40 to 55% by weight of acrylic acid amide units; with an intrinsic viscosity $[\eta]$ of from 1 to 2 dl/g and preferably 1.5 dl/g.

To accelerate the hydrolysis reaction which is preferably carried out at 180° C. to 200° C., from 0.1 to 3% of inorganic salts, such as water-soluble carbonates, phosphates, borates, which show a basic effect through hydrolysis, and/or urea and/or urea derivatives may optionally be used. The concentration of the polymer in water during hydrolysis should amount to 10 to 30% by weight. Hydrolysis is preferably continued until the polyacrylonitrile is completely hydrolysed. However, it is also possible to produce hydrolysates containing 70% to 30% of acrylic acid, 30% to 70% of acrylic acid amide and 0.1 to 20% of acrylonitrile which are particularly suitable for use as bore flushing compositions.

The aqueous homogeneous polyacrylonitrile hydrolysates produced in accordance with the invention may also be dried, for example by means of cylinder dryers, in which case, a free-flowing, pale yellow dry product is obtained.

EXAMPLE 1

175.0 kg of water, 0.95 kg of polyacrylonitrile hydrolysate (31.7% by weight of COOH groups, expressed as polyacrylic acid=54% by weight), 5.7 kg of acrylonitrile and 0.3 kg of methyl acrylate are introduced into a 500 liter capacity, stirrer-equipped, autoclave designed for a pressure of 30 bars and, after the autoclave has been closed, its contents are heated with stirring to 60° C. under nitrogen as an inert gas. 0.15 kg of ammonium persulfate and 0.15 kg of sodium pyrosulfite, each in 3 liters of water, are then added through a pressure lock. After 10 minutes, mixtures I, II and III are continuously and simultaneously introduced into the autoclave, the contents of the autoclave being kept at 60° C.:

Mixture I: 51.3 kg of acrylonitrile; and 2.7 kg of methyl acrylate,

Mixture II: 27.0 kg of water; and 0.3 kg of ammonium persulfate,

Mixture III: 27.0 kg of water; and 0.3 kg of sodium pyrosulfite; and 8.55 kg of polyacrylonitrile hydrolysate (31.7% by weight of COOH-groups, expressed as polyacrylic acid=54% by weight).

After the addition, the reaction mixture is left for 2 hours at 60° C. The temperature of the autoclave contents is then increased to 195° C. and, after hydrolysis has commenced, is reduced to 180° C. by distillation at a cooling rate of 5° C./30 minutes. After another 60 minutes at 180° C., the progress of hydrolysis is observed by sampling. By measuring the viscosity of the samples with a Haake VT 24 Viskotester at 80° C., the viscosity trend is recorded in a prepared viscosity/reaction time diagram. When the required viscosity is reached, more water is distilled off and the contents of the autoclave are further cooled. At around 90° C., the water which has been distilled off is replaced and, after cooling to 30° C., the mixture is run off. The clear, straw-yellow product obtained has the following analytical data:

solids content: 30% by weight
pH-value: 6.4
Hoppler viscosity (25° C.): 7300 mPs
relative viscosity $\eta_{rel}$: 2.30
carboxyl group content expressed as polymeric acrylic acid: 40% by weight solids
residual monomeric AN: <1 ppm (undetectable)
nitrile groups: clearly detectable in the IR spectrum at 2240 $cm^{-1}$

EXAMPLE 2

A hydrolysis product is prepared in the same way as described in Example 1, except that 2.1 kg of isopropanol were additionally introduced into the autoclave. The clear, straw-yellow product obtained has the following analytical data:

solids content: 30% by weight
pH-value: 6.7
Hoppler viscosity (25° C.): 2350 mPs
relative viscosity $\eta_{rel}$: 1.80
carboxyl group content expressed as polymeric acrylic acid: 41% by weight of solids
residual monomeric AN: <1 ppm (undetectable)
nitrile groups: clearly detectable in the IR-spectrum at 2240 $cm^{-1}$ To test the effectiveness of the polyacrylonitrile hydrolysate used as a protective colloid, the process described in Example 1 was stopped before heating from 60° C. in Examples 4 and 5 and the polymerisation product was examined.

EXAMPLE 3

This Example is intended to show how polyacrylonitrile hydrolysates having reduced viscosities and higher carboxyl group contents, expressed as acrylic acid, are obtained in accordance with this invention.

The procedure is as described in Example 1, except that 3.5 kg of isopropanol were additionally introduced into the autoclave. In contrast to Example 1, the mixture is hydrolysed until two samples taken at an interval of 15 minutes show no further change in viscosity at 80° C. The mixture is then kept at 180° C. for 2 hours and subsequently cooled. The straw-yellow product obtained has the following analytical data:

solids content: 35% by weight
pH-value: 6.8
Hoppler viscosity 25° C.: 2050 mPs
relative viscosity $\eta_{rel}$: 1.71
carboxyl group content expressed as polymeric acrylic acid: 50% by weight of solids
residual monomeric AN: <1 ppm (undetectable)
nitrile groups: undetectable in the IR-spectrum

EXAMPLE 4 (Comparison)

4000 g of water, 380 g of acrylonitrile and 20 g of methyl acrylate are introduced into a 15-liter-capacity stirrer-equipped autoclave and, after the autoclave has been closed, are heated with stirring to 60° C. under nitrogen as an inert gas.

10 g of ammonium persulfate and 10 g of sodium pyrosulfite, each in 100 ml of water, are then added through a pressure lock.

10 minutes after the addition, mixtures I, II and III are continuously and simultaneously introduced into the autoclave, the contents of the autoclave being kept at 60° C.:

Mixture I: 3420 g of acrylonitrile; and 180 g of methyl acrylate.
Mixture II: 900 g of water; and 10 g of ammonium persulfate.
Mixture III: 900 g of water; and 10 g of sodium pyrosulfite.

After the addition, the reaction mixture is left for 2 hours at 60° C. After cooling to 20° C., the polymerisation product is run off. The product obtained contains precipitating monomer and coarse granulate. The yield is only around 80% and is unsuitable for hydrolysis without mechanical size-reduction.

EXAMPLE 5

The procedure was as described in Example 4, except that 38.8% by weight polyacrylonitrile hydrolysate containing 55% by weight of polymeric acrylic acid produced in accordance with the invention from a polyacrylonitrile having an intrinsic viscosity of 1.56 dl/g was introduced into the autoclave and into mixture III in quantities of 50 g and 465 g, respectively.

The product obtained was a fine, white suspension (yield 99.5%) having a flowout time of 55 seconds (4 mm $\phi$ Ford cup) and is eminently suitable for hydrolysate production after corresponding dilution with water.

The relative viscosity of the aqueous solution of the products obtained according to the invention was determined in an Ubbelode viscometer by comparing the throughflow velocity of a 2 N sodium nitrate solution and a 2 N sodium nitrate solution containing 1% by weight (based on the solids content) of the particular polyacrylonitrile hydrolysate to be tested at 25° C.

The COOH-group content, expressed as polymeric acrylic acid, was determined by conductometric titration. To determine the total content of polymeric acrylic acid as indicated (non-neutralised polyacrylic acid and ammonium polyacrylate, NaOH was used as the titrator.

The residual monomer content was determined by gas chromatography.

The presence and absence of nitrile groups was tested in an infra-red spectrometer.

To determine the intrinsic viscosity [$\eta$], the polymer was concentrated by freezing, dried and dissolved in dimethyl formamide. After separation of the insoluble fractions, which were identified as polyacrylonitrile hydrolysate used for polymerisation, the determination was carried out at 25° C. For the definition of intrinsic viscosity, see H.-G. Elias, "Makromoleküle", Hüthig und Wepf-Verlag, Basle, page 265.

We claim:

1. A process for the production of a watersoluble hydrolysis product of an acrylonitrile homopolymer and/or copolymer which comprises polymerising acrylonitrile and, optionally, other monomers, in aqueous media, at a temperature of from 35° C. to 80° C. in the presence of from 1 to 8% by weight, based on the monomer to be polymerised of a hydrolysed acrylonitrile homopolymer and/or copolymer having an intrinsic viscisity [$\eta$] of from 0.8 to 2.5 dl/g as protective colloid and hydrolysing the resulting polymer.

2. A process as claimed in claim 1, wherein the resulting polymer is hydrolysed without being isolated from the reaction mixture.

3. A process as claimed in claim 1, wherein polymerisation is carried out by suspension polymerisation.

4. A process as claimed in claim 3, wherein the proportion of organic substances to water is from 30 to 40% by weight.

5. A process as claimed in claim 1, wherein from 1 to 8% by weight of isopropanol are added to the polymerisation mixture.

6. A process as claimed in claim 1, wherein hydrolysis is carried out at a temperature of 180° C. to 200° C.

7. A process as claimed in claim 1 wherein as protective colloid a hydrolysed polyacrylonitrile homopolymer and/or copolymer consisting of 45 to 60% by weight of ammonium acrylate units and 40 to 55% by weight of acrylic acid amide units, with an intrinsic viscosity of from 1 to 2 dl/g is used.

8. A process as claimed in claim 1, wherein as protective colloid a hydrolysed polyacrylonitrile homopolymer and/or copolymer is used which is identical with the homo- or copolymer to be produced.

* * * * *